May 15, 1928.

F. STONE

BEAN HARVESTER

Filed Aug. 31, 1926

Floyd Stone Inventor

By C.A.Snow &Co.

Attorneys.

Patented May 15, 1928.

1,669,917

UNITED STATES PATENT OFFICE.

FLOYD STONE, OF YORK, NEBRASKA.

BEAN HARVESTER.

Application filed August 31, 1926. Serial No. 132,775.

This invention relates to agricultural machines and aims to provide a novel form of machine especially designed for harvesting beans, peas or similar podded vegetables.

The primary object of the invention is to provide a machine of this character which will cut the vines at points adjacent to the ground surface and convey the vines and pods rearwardly into a pivoted carrier which may be operated to discharge the vines and vegetables carried thereby at predetermined points.

A still further object of the invention is to provide adjustable cutters which may be operated from a point adjacent to the operator's seat, whereby the operator may have control of the cutters at all times, to adjust them vertically to compensate for irregular ground surfaces.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings.

Figure 1:
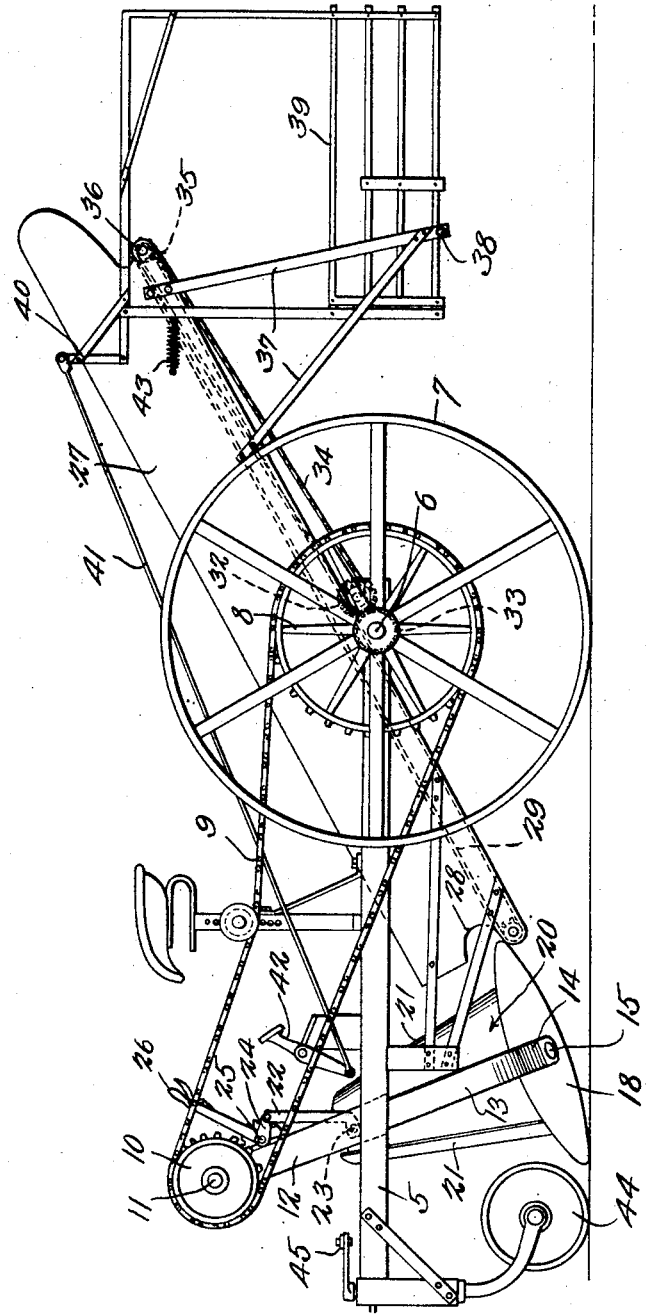
Figure 1 is a side elevational view of a bean harvesting machine constructed in accordance with the invention.
Figure 2:
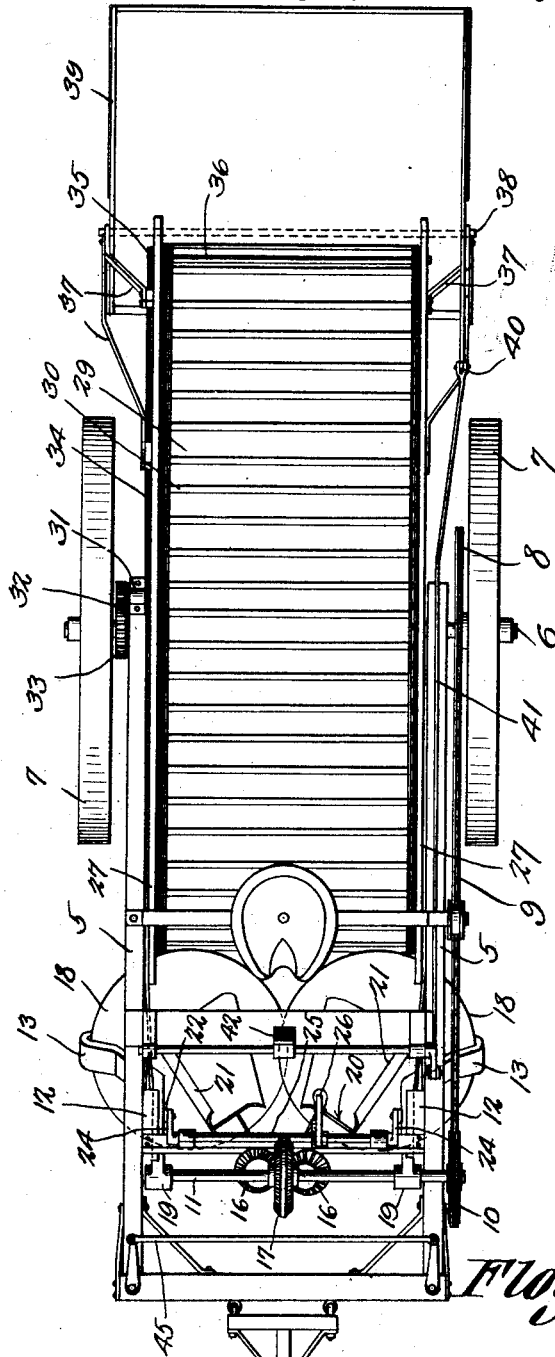
Figure 2 is a plan view thereof.

Referring to the drawings in detail, the machine embodies a wheel supported frame including side members 5 to which the axle 6 is secured, and on which the wheels 7 are mounted.

Secured to one of the wheels 7 is a sprocket 8 over which the chain 9 operates, the chain 9 also operating over the sprocket 10 mounted on the shaft 11 to rotate the shaft 11 for operating the knives.

Mounted at the forward end of the machine and secured to the side members 5, are guideways 12 in which the bars 13 of the knife supporting frame operate. This knife supporting frame has inwardly extended end portions 14 provided with openings to receive the lower ends of the shafts 15 which carry pinions 16 at their upper ends meshing with the pinions 17 mounted on the shaft 11, which in turn operates in the bearings 19.

Figure 3:
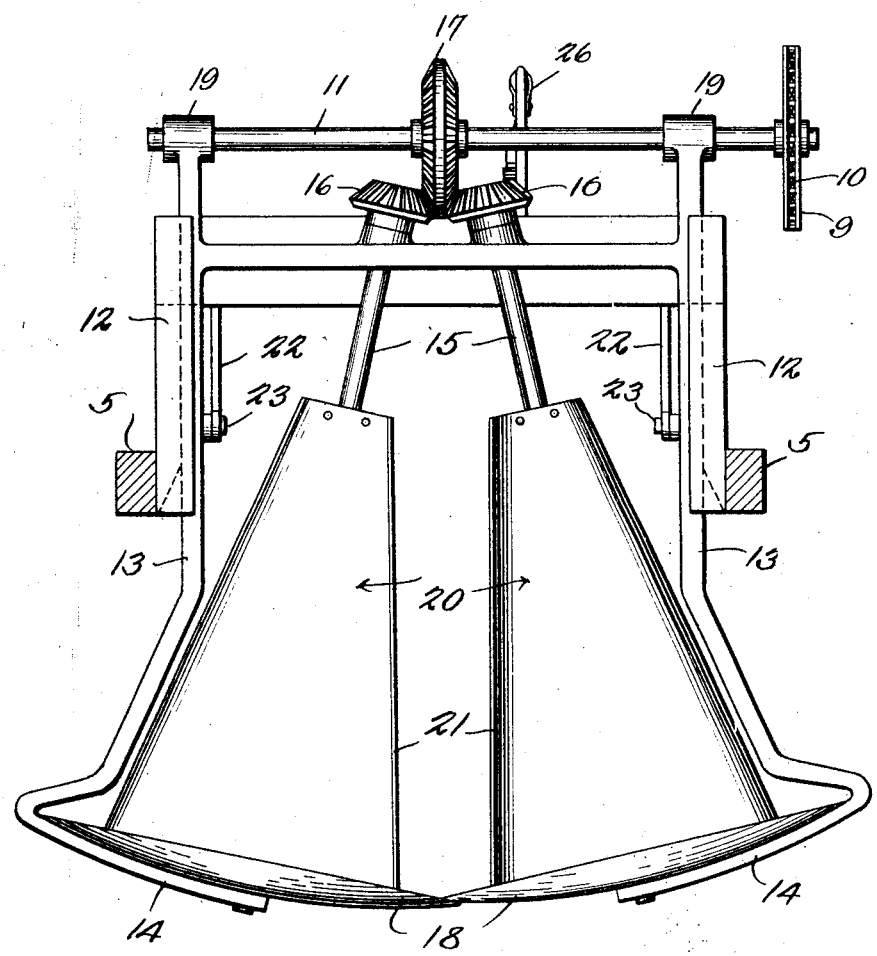
Figure 3 is a front elevational view of the cutters employed for cutting the vines.

As clearly shown by Figure 3 of the drawings, the blades are disk-like in formation and are indicated by the reference character 18, the blades having upper or body portions 20 that are substantially frusto-conical in formation and embody a plurality of curved feeding blades 21 adapted to catch the vines to feed them into the machine.

Links 22 are connected with the bars 13 at 23 and have connection with the arms 24 carried by the shaft 25, there being provided a hand lever 26 for operating the shaft 25 to move the same, with the result that the knife supporting frame may be adjusted longitudinally of the member 12 to elevate or lower the knives with respect to the ground surface and compensate for irregularities in the ground surface.

The conveyor forming an important feature of the invention embodies side members 27 which have their forward edges cut away as at 28 to provide clearances for the blades 18 to permit of such vertical adjustment of the blades and at the same time provide a construction wherein the material will be fed directly onto the conveyor.

The conveyor which is indicated at 29 is of the endless type and is provided with slats 30 to engage the material and carry it rearwardly to the receiving frame mounted at the rear of the endless conveyor. On one of the side members of the frame is a bearing 31 in which a shaft is mounted, the shaft carrying a gear 32 meshing with the pinion 33 that is mounted on the shaft 6. A sprocket is carried on the inner end of the shaft that is mounted in the bearing 31 over which sprocket the chain 34 moves, the chain also operating over the sprocket 35 carried on one end of the shaft 36 and over which the endless conveyor moves.

At the rear of the endless conveyor are downwardly extended bars 37 that brace the receiving frame, there being provided a shaft 38 on which the receiving frame which is indicated at 39, is pivotally mounted.

This receiving frame 39 is supplied with an upstanding arm 40 to which the rod 41 is connected, the rod having connection with the foot lever 42 as shown by Figure 1, so that the operator may by forcing the member 42 downwardly force the receiving frame to its tilting position to discharge the vines or material delivered thereto.

A coiled spring 43 has connection with the receiving frame to return the frame to its initial position after it has been dumped by the operator. Wheels 44 are mounted at the forward end of the machine and are connected by means of the rod 45 so that they may be moved to guide the machine.

From the foregoing disclosure, it will be seen that the machine may be moved along a row of vines to be harvested, the knives cutting the vines while the blades 21 pick up the vines and carry them immediately to the endless conveyor from where they are deposited in the receiving frame and finally dumped into piles.

I claim:

1. In a machine of the class described, a wheel supported frame, rotary cutting blades mounted at the forward end of the frame, vertical blades adapted to engage the material being harvested to draw the material into the blades, an endless conveyor for receiving material from the blades, and a pivoted receiving frame for receiving material from the endless conveyor.

2. In a device of the class described, a wheel-supported frame, rotary cutting blades mounted at the forward end of the frame, vertical blades operating above the first mentioned blades and adapted to grip material and carry material into the rotary blades, an endless conveyor adapted to receive material from the blades, and a receiving frame for receiving material from the endless conveyor.

3. In a machine of the class described, a wheel-supported frame, frusto-conical members supported at the forward end of the frame and having blades formed on the sides thereof, disk-like blades at the lower ends of the frusto-conical members for cutting material, and means for receiving the material from the blades.

In testimony that I claim the foregoing as my own, I have hereto affixed my signature.

FLOYD STONE.